(12) United States Patent
Mirzavand Boroujeni et al.

(10) Patent No.: US 11,276,928 B1
(45) Date of Patent: Mar. 15, 2022

(54) CALIBRATING/MONITORING METHOD AND APPARATUS FOR PHASED ARRAY ANTENNA EMPLOYING VERY NEAR FIELD

(71) Applicant: THE GOVERNORS OF THE UNIVERSITY OF ALBERTA, Edmonton (CA)

(72) Inventors: Rashid Mirzavand Boroujeni, Edmonton (CA); Pedram Mousavi, Edmonton (CA)

( * ) Notice: Subject to any disclaimer, the term of this patent is extended or adjusted under 35 U.S.C. 154(b) by 0 days.

(21) Appl. No.: 17/096,918

(22) Filed: Nov. 12, 2020

Related U.S. Application Data

(63) Continuation of application No. 16/984,819, filed on Aug. 4, 2020, now abandoned, which is a continuation of application No. 16/842,908, filed on Apr. 8, 2020, now abandoned.

(60) Provisional application No. 62/832,035, filed on Apr. 10, 2019.

(51) Int. Cl.
*H01Q 3/26* (2006.01)
*H04B 17/12* (2015.01)
*H04B 7/0413* (2017.01)
*H04B 17/21* (2015.01)
*H04B 5/00* (2006.01)

(52) U.S. Cl.
CPC .......... *H01Q 3/267* (2013.01); *H04B 5/0043* (2013.01); *H04B 7/0413* (2013.01); *H04B 17/12* (2015.01); *H04B 17/21* (2015.01)

(58) Field of Classification Search
CPC ...... H01Q 3/267; H04B 17/21; H04B 5/0043; H04B 7/0413; H04B 17/12
See application file for complete search history.

(56) References Cited

U.S. PATENT DOCUMENTS

| | | |
|---|---|---|
| 4,517,570 A | 5/1985 | Gray, Jr. |
| 5,229,776 A | 7/1993 | Kelly et al. |
| 5,410,319 A | 4/1995 | Lopez et al. |
| 5,477,229 A | 12/1995 | Caille et al. |
| 5,572,219 A | 11/1996 | Silverstein et al. |
| 5,644,316 A | 7/1997 | Lewis et al. |
| 6,084,545 A | 7/2000 | Lier et al. |
| 6,163,296 A | 12/2000 | Lier et al. |
| 6,600,445 B2 | 7/2003 | Li |
| 6,636,173 B2 | 10/2003 | Graham |
| 6,900,775 B2 | 5/2005 | Shapira |
| 7,119,739 B1 | 10/2006 | Struckman |

(Continued)

*Primary Examiner* — Ankur Jain
*Assistant Examiner* — Angelica M Perez
(74) *Attorney, Agent, or Firm* — Anglehart et al.

(57) ABSTRACT

A monitoring/calibrating system is provided based on the amplitude and/or phase of electric and/or magnetic fields measurements. In transmitter mode of AUT, one or more probe sets are placed very close to the AUT around the radiation aperture of AUT to prevent probes effects on the AUT performance. For each amplitude/phase state of AUT controller, the near field data are measured and compared with a previously stored dataset. A successive method can reduce the error by changing the amplitude/phase of AUT controller. Moreover, a machine learning method can be used to classify the errors in near field data, errors in amplitude/phase of AUT controller, and automatically tuning the AUT controller. In receiver mode of AUT, the system is the same but the probe sets are working as transmitters to make a known near field around the AUT.

18 Claims, 14 Drawing Sheets

(56) References Cited

U.S. PATENT DOCUMENTS

| | | |
|---|---|---|
| 7,362,266 B2 | 4/2008 | Collinson |
| 7,768,453 B2 | 8/2010 | Mason et al. |
| 2006/0009162 A1 | 1/2006 | Tan et al. |
| 2014/0300519 A1* | 10/2014 | Estebe .................. G01S 7/4026 |
| | | 343/703 |
| 2015/0349420 A1 | 12/2015 | O'Haver |
| 2020/0145056 A1* | 5/2020 | Janse Van Rensburg ................... |
| | | G01R 29/0878 |

* cited by examiner

CALIBRATING/MONITORING METHOD AND APPARATUS FOR PHASED ARRAY ANTENNA EMPLOYING VERY NEAR FIELD

CROSS-REFERENCE TO RELATED APPLICATIONS

This application is a continuation of Ser. No. 16/984,819 filed Aug. 4, 2020, that is a continuation of Ser. No. 16/842,908 filed Apr. 8, 2020, which claims priority from U.S. Provisional Patent Application 62/832,035 filed Apr. 10, 2019, the specification of which is incorporated herein by reference.

TECHNICAL FIELD

The present disclosure relates to the array antennas, and more particularly to the phased array antenna calibration and monitoring using very near field probes.

TECHNICAL BACKGROUND

In modern telecommunication systems, specially 5G networks, using phased array antennas and MIMO antenna systems are inevitable to provide higher data rates and/or to extend the communication link length. Using smart antennas can improve the effective radiated power which will increase the range or will reduce the total radiation power. Moreover, smart antennas have precise applications such as automobile safety radar systems and direction finding of unmanned aerial vehicles because the phased array antenna provides a controllable radiation pattern. Usually a set of digitally controlled phase shifters and variable amplifiers/attenuators is used to change the phase and amplitude of array antenna elements and get a specific radiation pattern.

To have an accurate pattern of phased array, a calibration procedure is necessary for the phase shifters and variable amplifiers/attenuators. A calibration is usually applied at the factory but an on-site calibration and the real-time monitoring is essential for precise applications. Some real-time calibration or monitoring methods were presented for array antennas which are generally based on three methods of using an adjacent probe to each antenna element, one or more probe antenna between the array antenna elements, and far-field measurement. The first method of adjacent probing has small effect on the antenna performance but this method measures the antenna elements individually not the overall array radiation which includes the interacts and couplings between elements. Therefore, the first method may have more error in array performance estimation. The second method of probe(s) antenna between the array antenna elements may have less error with respect to the first method in terms if overall array estimation but it antenna probes may have more effects on the array performance and the final array results may vary from the original array without probes results. The last method of far-field measurement may provide the best radiation performance measurement of arrays without unwanted effects from measurement setup but it may be used in some specific real-time applications such as the satellite communication and direction finding systems that work in long distances and have a limited pattern variations.

Performance analysis of antennas can be down by the electromagnetic fields measurement in the near-field region of antennas. The near field measurement helps to reduce the size of anechoic chamber for antenna measurements, especially in low frequencies where a very big room is required for far-field measurements. The measured eclectic and/or magnetic near-field data can be used to identify the radiating sources, charge, and current distributions of radiative elements. The measurement points can be selected on a plane, a cylinder, or a sphere around the antenna using a mobile probe or a set of probes. As the probes should be moved or placed in front of antenna, the measurement procedure interrupts the antenna operation and therefore a real-time calibrating/monitoring is very hard or even impossible. Moreover, the prediction of electric and magnetic fields in the very near field (reactive region) of an antenna is often too complicated, which is the case when the measurements should be done in the very close to antenna points.

Machine-learning algorithms can be used to predict the performance of a system from patterns of various measurement results without using an explicit instruction. These algorithms have found a wide variety of applications, from the medical diagnosis and computer vision to the telecommunication and user behavior analytics.

BRIEF DESCRIPTION OF THE DRAWINGS

Example embodiments of the present invention are described with reference to the following drawings. In the drawings, like elements are assigned like reference numerals. The drawings are not necessarily to scale unless indicated.

DETAILED DESCRIPTION

The main problem in implementing real-time on-site array antenna calibration and monitoring is measurement setup effects on the antenna performance which makes the antenna measurements impossible when the system is working. In most applications, the far-field measurement can not be used for on-site calibration due to the space limitations and the conventional near-field measurement will be complicated and expensive as mobile probe(s) are necessary to support two cases of calibration and normal operation. These difficulties are getting more pronounced when a precise smart antenna needs continues monitoring, as the system could not be stopped during the normal operation for putting measurement probe(s) in front of it. The proposed antenna calibration/monitoring system solved this problem by a proprietary near-field measurement architecture that does not interrupt the antenna performance during the over the air (OTA) tests. Moreover, the application of machine-learning algorithms is proposed to effectively predict the performance of phased array antennas from very near field measurements in various phase and/or amplitude states without using an explicit instruction to monitor and diagnose the phased array antennas.

The examples presented herein provide various embodiments of antenna array calibration/monitoring system. These calibration/monitoring system may be employed in precise smart antennas, such as 5G communication systems, automobile safety radar systems, and unmanned aerial vehicles. Specifically, enclosed measurement probes can be used in the mobile systems to have a fixed calibration/monitoring subsystem with respect to the antenna under test. The fixed position can reduce the complexity and cost of the system, significantly.

Figure 1:
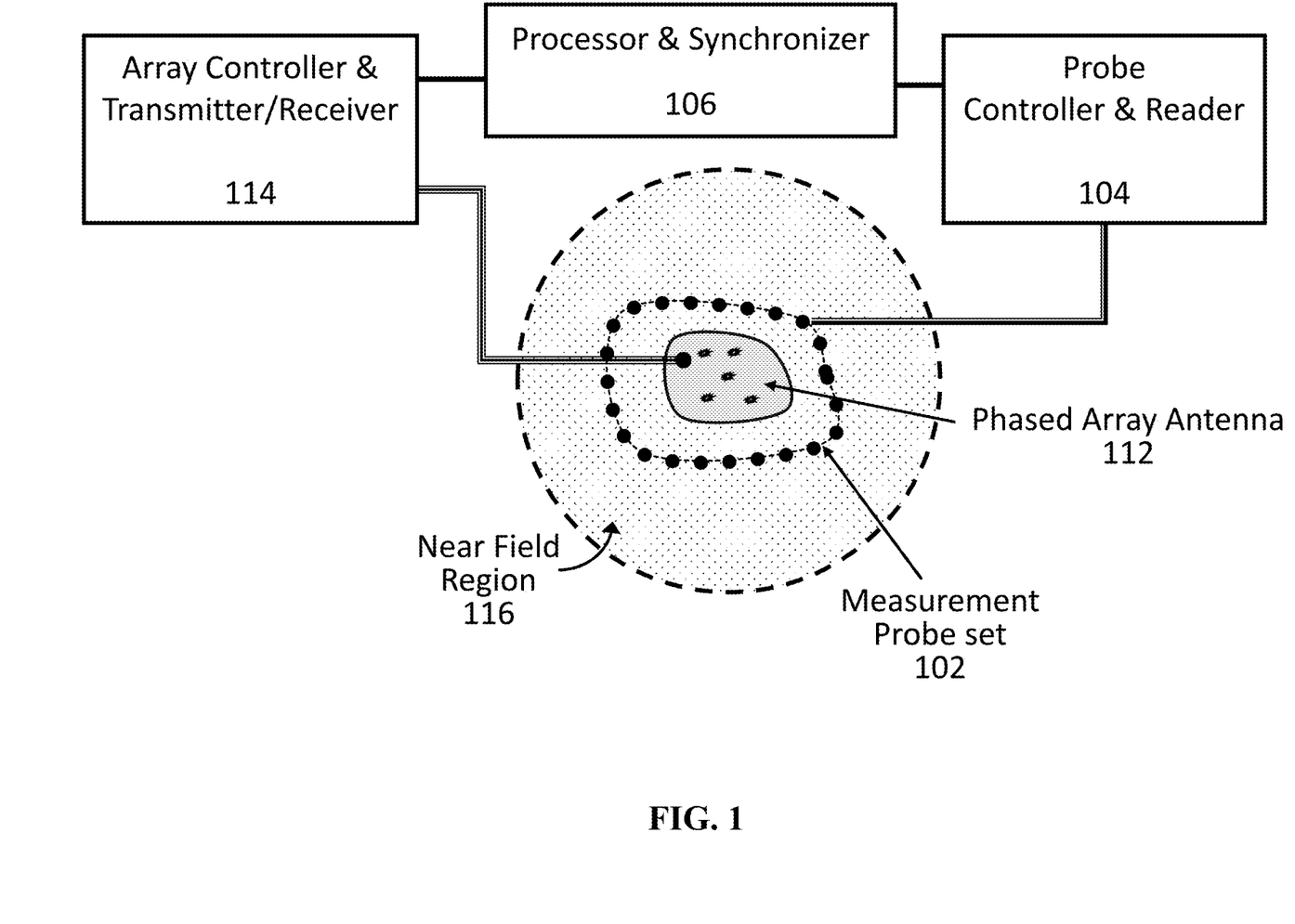
FIG. 1 is a schematic of a calibrating/monitoring a phased array antenna in near field region.

In one aspect, FIG. 1, a phased array antenna calibration/monitoring system includes a measurement probe set 102, a probe controller & reader 104 and a Processor & Synchronizer 106. For a phased array antenna 112, which is fed and controlled by a transmitter & array controller 114. The probe set 102 is placed in the near field region 116 of phased array antenna 112.

Figure 2:
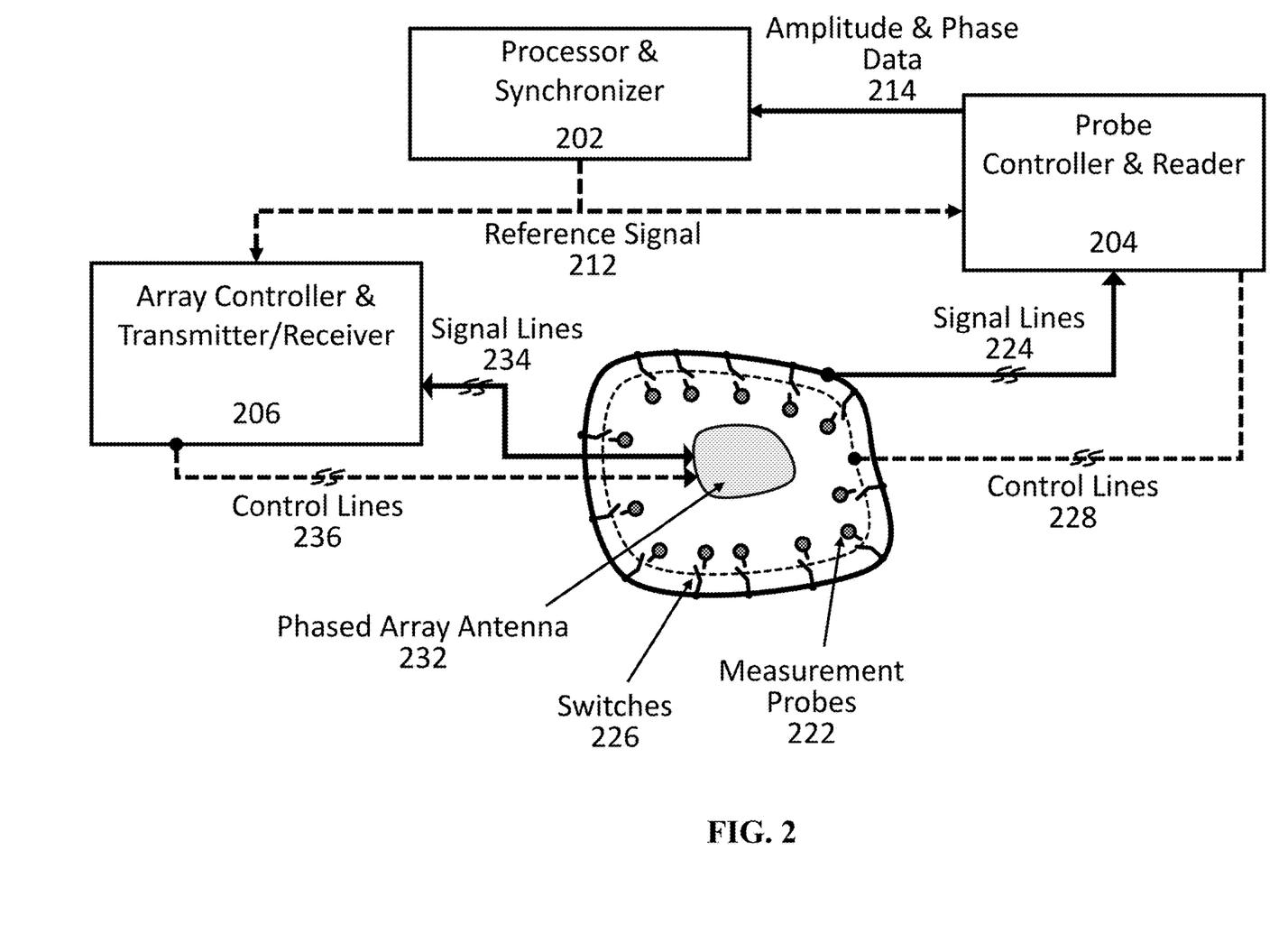
FIG. 2 is a detailed schematic of a signal and control lines for a phased array antenna calibrating/monitoring system.

As shown in FIG. 2, a processor/synchronizer unit 202 synchronizes the probe controller 204 and array controller 206 using a reference signal 212. The processor/synchronizer unit 202 also gets amplitude and phase data 214 from the probe controller/reader unit 204 for post processing. The probe controller/reader 204 is connected to the measurement probes 222 by some signal lines 224 to get signals from some probes. A number of probes from the probe set 222 can be connected to the signal lines 224 via a switch set 226. The switches 226 are turned on and off by some control lines 228 which are connected to the probe controller/reader 204. Based on the number of channels, which are available in the probe reader 204, the same number of probes can be selected and read at the same time. The reader 204 can be implemented by some power detectors or by some receivers which are working at the same frequency of phased array antenna 232. For a monitoring system, the probe controller 204, which provides signal lines 224 and control lines 228 to make probes 222 operational, and the array controller 206, which provides signal lines 234 and control lines 236 to make phased array antenna 232 operational, can be merged together and implemented in an integrated circuit as they are working in the same operating frequency.

Figure 3:
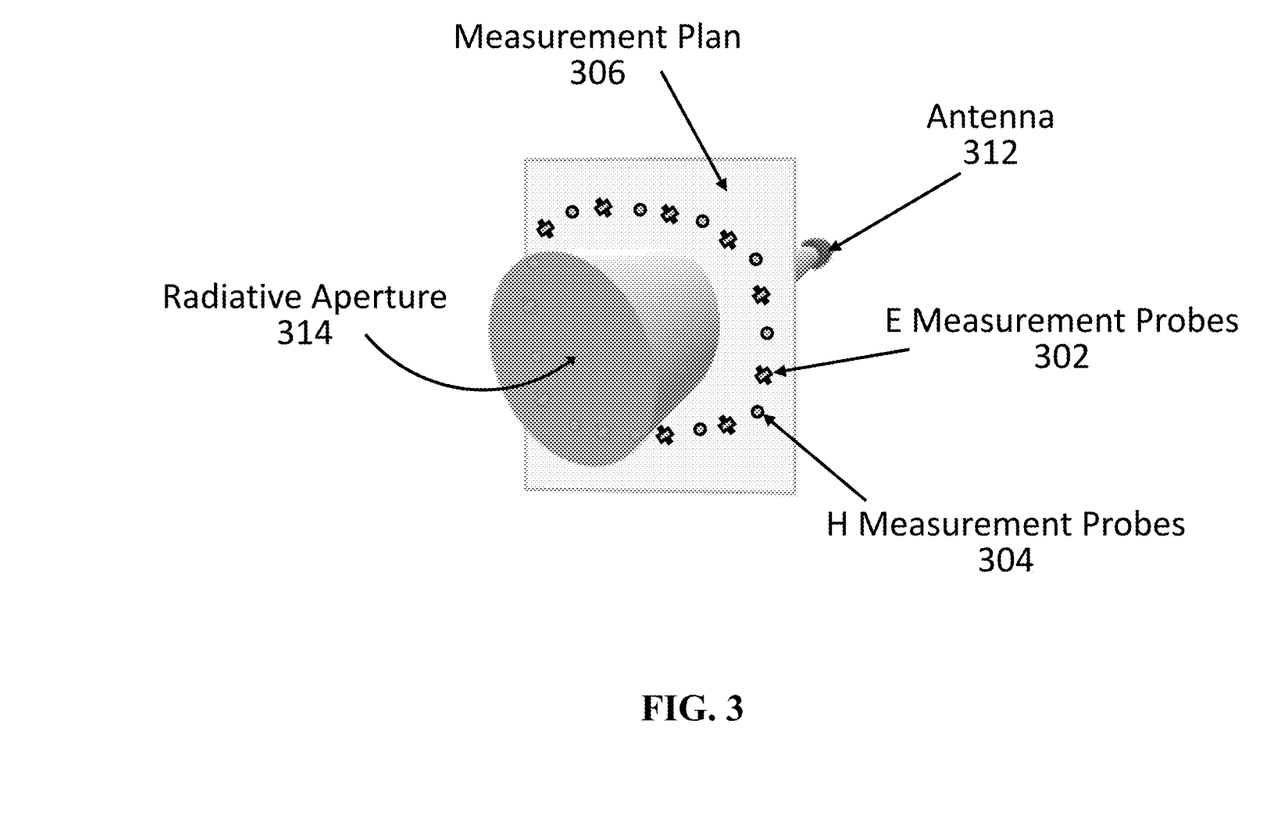
FIG. 3 is a set of E and H measurement probes over a measurement plan around the antenna radiation aperture.

In one aspect, FIG. 3, calibration/monitoring system includes both electric (E) measurement probes 302 and magnetic (M) measurement probes 304 on a measurement plan 306. The E probes 302 are placed in between H probes 304. If collocated field values are required, an interpolation method such as averaging, spline, and polynomials can be used to find E fields at H probe places and vise versa (H fields at E probe places). For the antenna 312 with radiative aperture 314, probes are placed in near-field region of antenna but around antenna's radiative aperture 314 to minimize the probes effects on the antenna performance.

Figure 4:
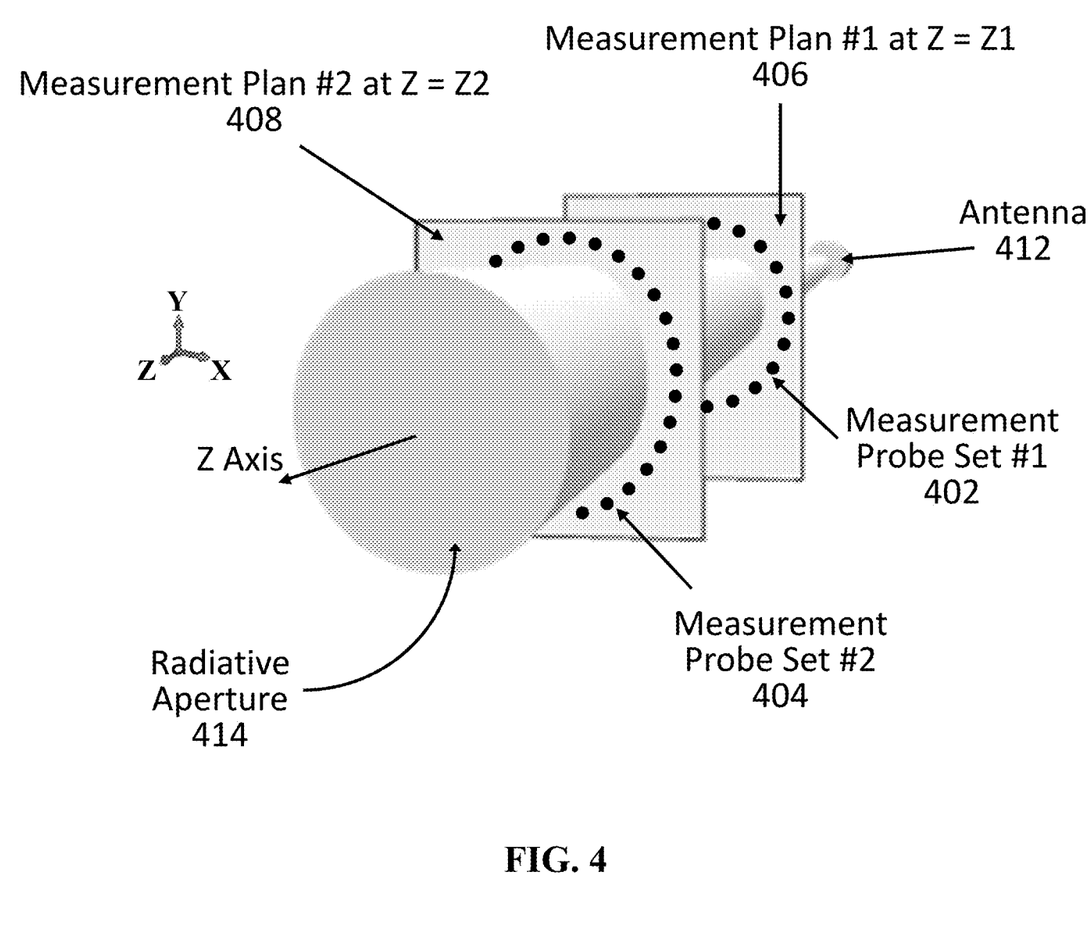
FIG. 4 is a two-set measurement probes over two measurement plan around the antenna radiation aperture.

In one aspect, FIG. 4, calibration/monitoring system includes two measurement probe sets 402 and 404 placed on measurement plan #1 at Z=Z1 406 and measurement plan #2 at Z=Z2 408. The probe sets are electric, magnetic, or a combination of electric and magnetic measurement probes (similar to FIG. 3) and are placed in near-field region of antenna 412 but around the antenna's radiative aperture 414 to minimize the probes effects on the antenna performance.

In receiver mode of AUT, the system is the same but the probe sets are working as transmitters array (TXA) to generate some known near field states around the AUT and the AUT receives the propagated signal and the received signal will be used in the calibration procedure.

EXAMPLES

Figure 5:
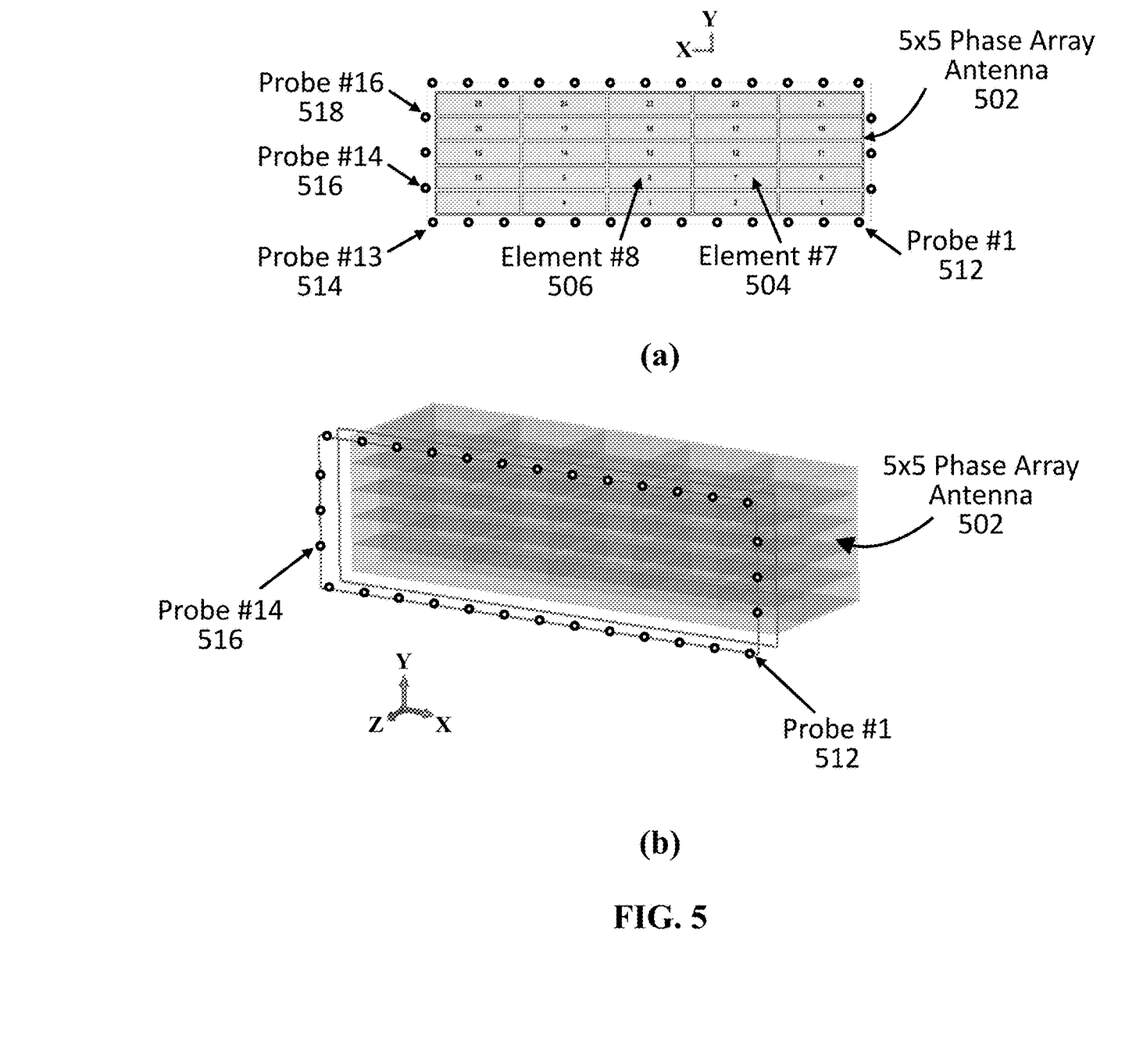
FIG. 5 are 2D and 3D views of a 5×5 phase array antenna and 32 very-closed measurement probes around it.

The 5×5 phased array antenna in FIG. 5 is selected as the first example. The operating frequency of antenna 502 is 3 GHz. The element size of array antenna is 58 mm by 13 mm and overall size of array is 300 mm by 75 mm. The amplitude of signal for all elements and the phase of vertically inline element are equal while the phase differs between each two adjacent horizontal array elements by a constant value of $\phi$, i.e. phases of elements #1 to #5 or #6 to #10 are 0, $\phi$, 2$\phi$, 3$\phi$, and 4$\phi$. Two elements of array, #7 504 and #8 506, are selected for studying the effect of errors in phase and/or amplitude of excitation signals. As an example, 32 probes are placed equally mm apart around the antenna over a 310 mm by 85 mm rectangle with 5 mm gap from the antenna. Some of probes are named in FIG. 5 as probe #1 512, probe #13 514, probe #14 516, probe #16 518.

Figure 6:
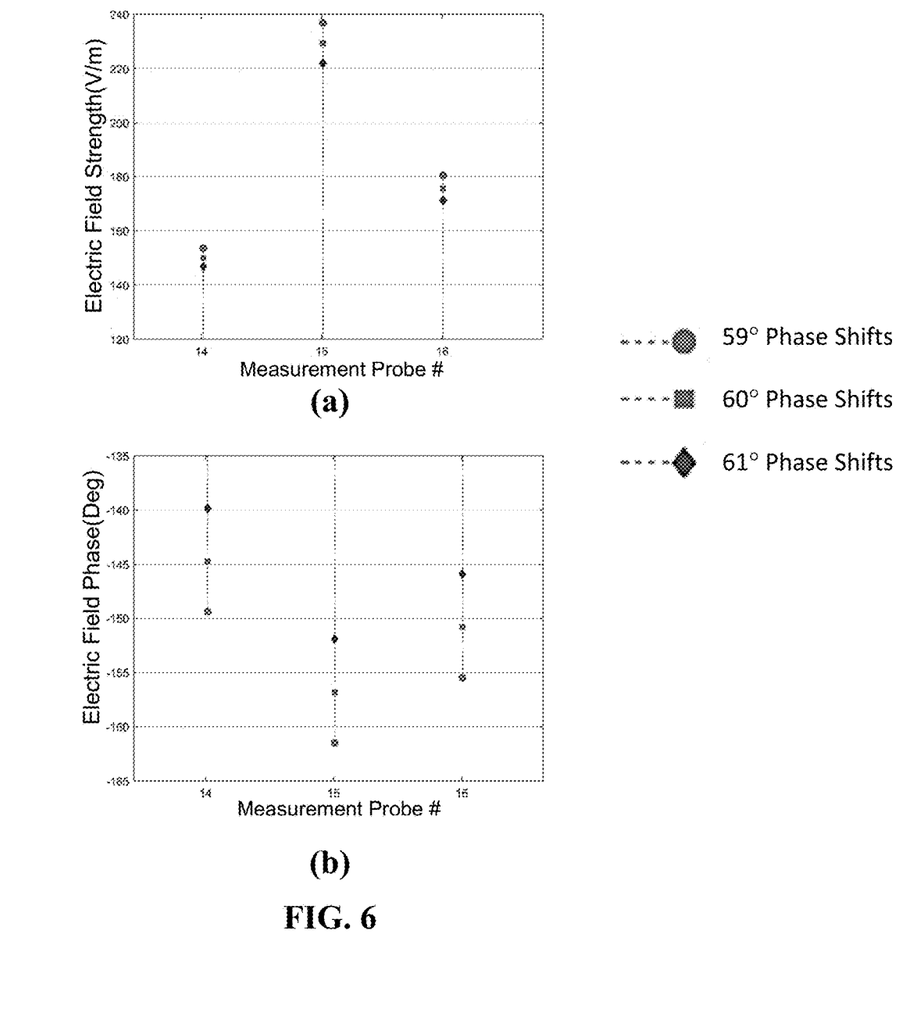
FIG. 6 are amplitude and phase of probes #14, #15, and #16 when phase difference between adjacent array elements are 59°, 60°, and 61°.

As the first test on phased array antenna of FIG. 5, the phase difference between all adjacent horizontal array elements, i.e. $\phi$, changes by a small value of one degree, for three cases of 59°, 60°, and 61°. In these cases, the vertical probes (#14 to #16 and #30 to #32) sense more variation with respect to the horizontal probes (#1 to #13 and #17 to #29). FIG. 6 shows the amplitude and phase of electric fields at probes #14, #15, and #16. The variations in both amplitude and phase of fields are obvious for such small changes in phase shifters.

Figure 7:
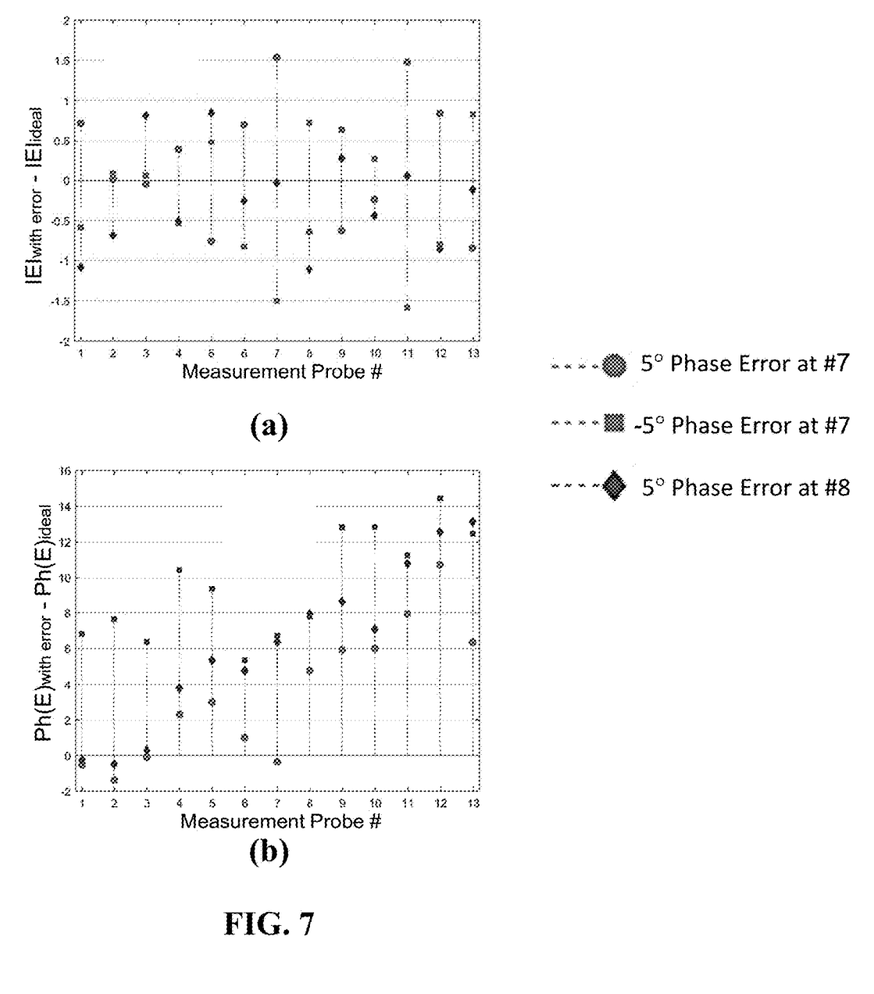
FIG. 7 are amplitude and phase of probes #1 to #13 when ±5° phase error were applied at array elements #7 or #8.
Figure 8:
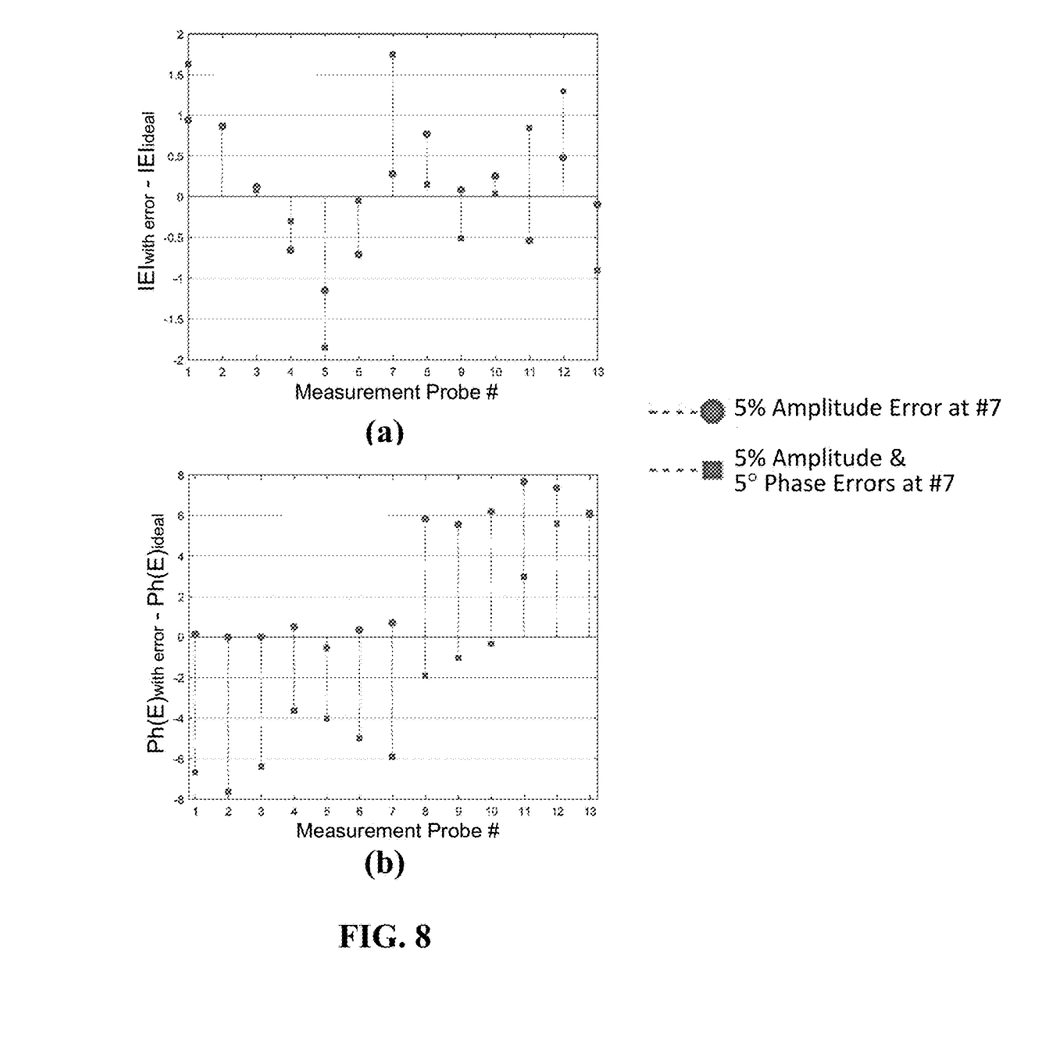
FIG. 8 are amplitude and phase of probes #1 to #13 when 5% amplitude or 5% amplitude plus 5° phase error were applied at array element #7.

The second test on phased array antenna of FIG. 5 is adding an error in phase of one array element. As practical and acceptable errors in conventional phase shifters and gain controllers, some cases of ±5° phase error and/or 5 percent amplitude error are applied to the elements #7 or #8. In these cases, the horizontal probes (#1 to #13 and #17 to #29) sense more variation with respect to the vertical probes (#14 to #16 and #30 to #32). FIGS. 7 and 8 show the difference in amplitude and phase of electric fields at probes #1 to #13 for faulty feed with respect to the ideal case. It can be seen in FIG. 7 that the +5° and −5° error in element #7 make equal error but with opposite signs in amplitude of electric fields while +5° error in element #8 has a different pattern. A 5 percent error in amplitude change the pattern of fields at probe positions in a completely different pattern, as shown in FIG. 8. The phase information of electric fields in both FIGS. 7 and 8 provide additional patterns that help to find the imperfections based on the errors in measured fields.

Figure 9:
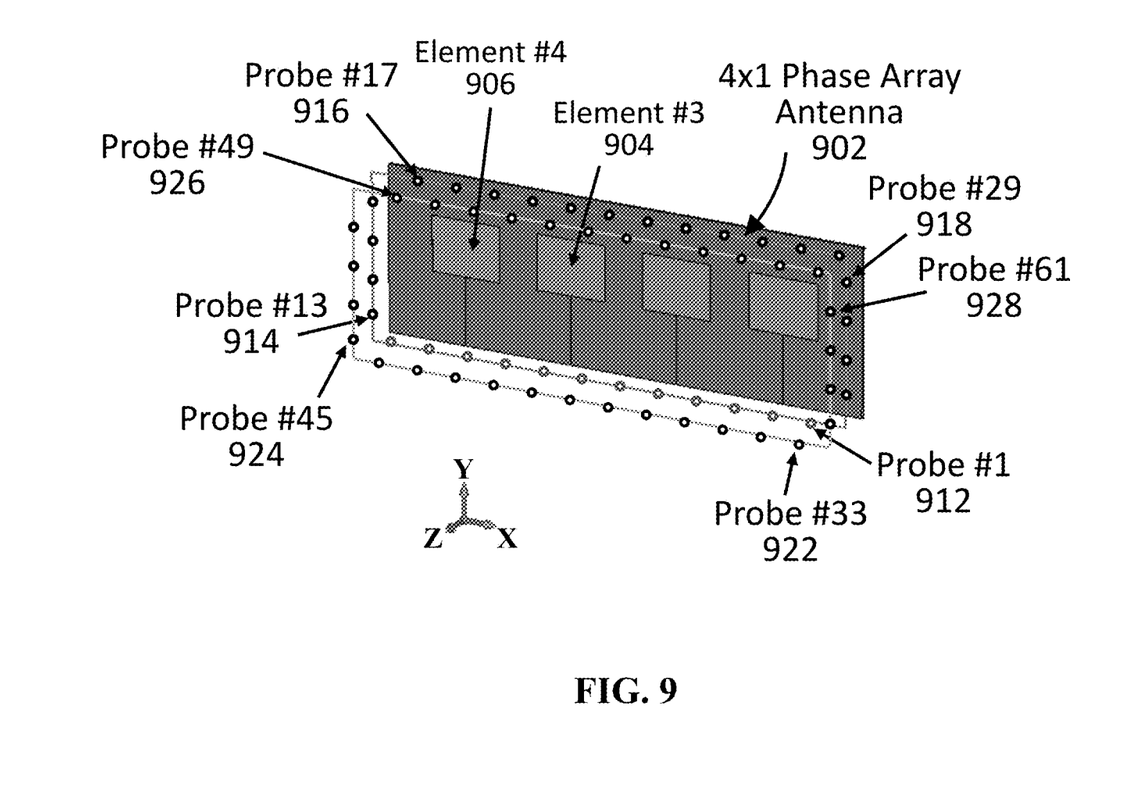
FIG. 9 is 3D view of a 4×1 phase array antenna and two sets of very-closed measurement probes (each of them has 32 probes) around it.

The second example is a 4×1 phased array antenna in FIG. 9. The operating frequency of antenna 902 is 79 GHz which has application in automobile safety radar systems. The overall size of array is 10.2 mm by 3.6 mm. The amplitude of signal for all elements are equal while the phase differs between each two adjacent array elements by a constant value of φ, i.e. phases of elements #1 to #4 are 0, φ, 2φ, and 3φ. Two elements of array, #3 904 and #4 906, are selected for studying the effect of errors in phase and/or amplitude of excitation signals. As an example, two sets of 32 probes are placed equally 0.85 mm apart around the antenna over a 10.4 mm by 3.8 mm rectangle. The probe set #1 with probe #1 to #32 and the probe set #2 with probe #33 to #64 have 0.2 mm and 1 mm space from the antenna in Z direction. Some of probes are named in FIG. 9 as probe #1 912, probe #13 914, probe #17 916, probe #29 918 in set #1 and probe #33 922, probe #45 924, probe #49 926, probe #61 928 in set #2.

Figure 10:
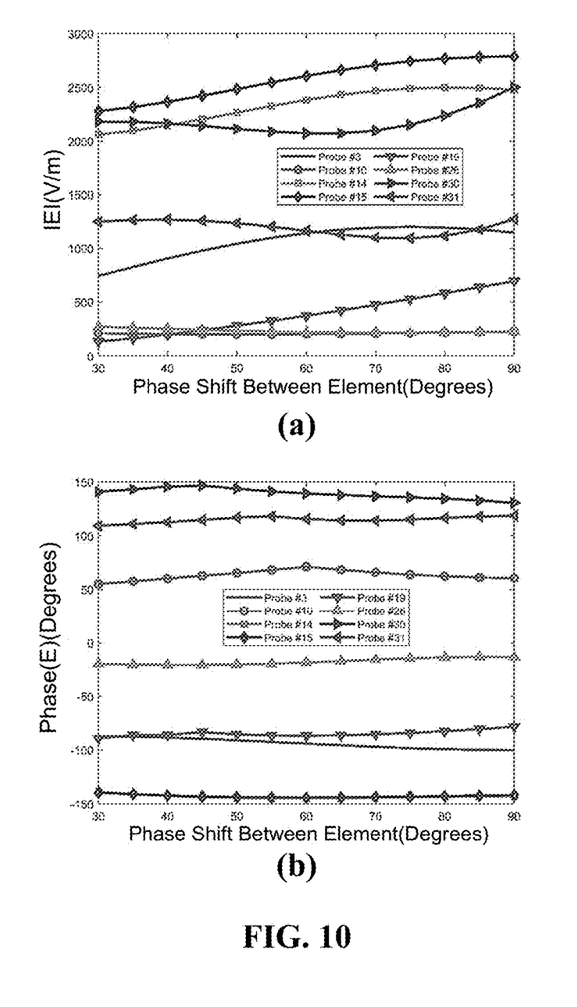
FIG. 10 are amplitude and phase of probes #3, #10, #14, #15, #19, #26, #30, and #31 when phase difference between adjacent array elements varies from 30° to 90°.

As the first test on phased array antenna of FIG. 9, the phase difference between all adjacent horizontal array elements, i.e. φ, changes in a wide range from 30° to 90°. As shown in FIG. 10(a), the probes #14 and #15 sense more variation in amplitude of electric fields with respect to other probes. FIG. 10(b) shows that the phase of electric fields have small variations for all probes.

Figure 11:
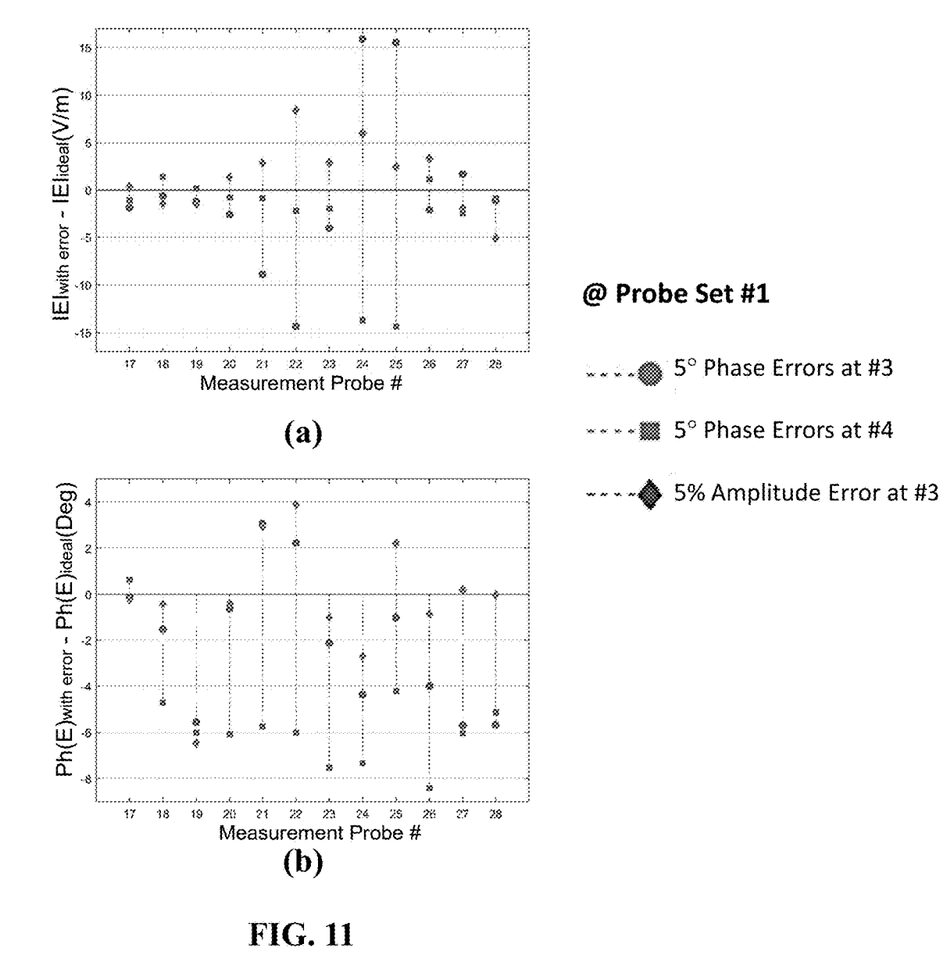
FIG. 11 are amplitude and phase of probes #17 to #28 from measurement probe set #1 when 5° phase error or 5% amplitude error were applied at array elements #3 or #4.
Figure 12:
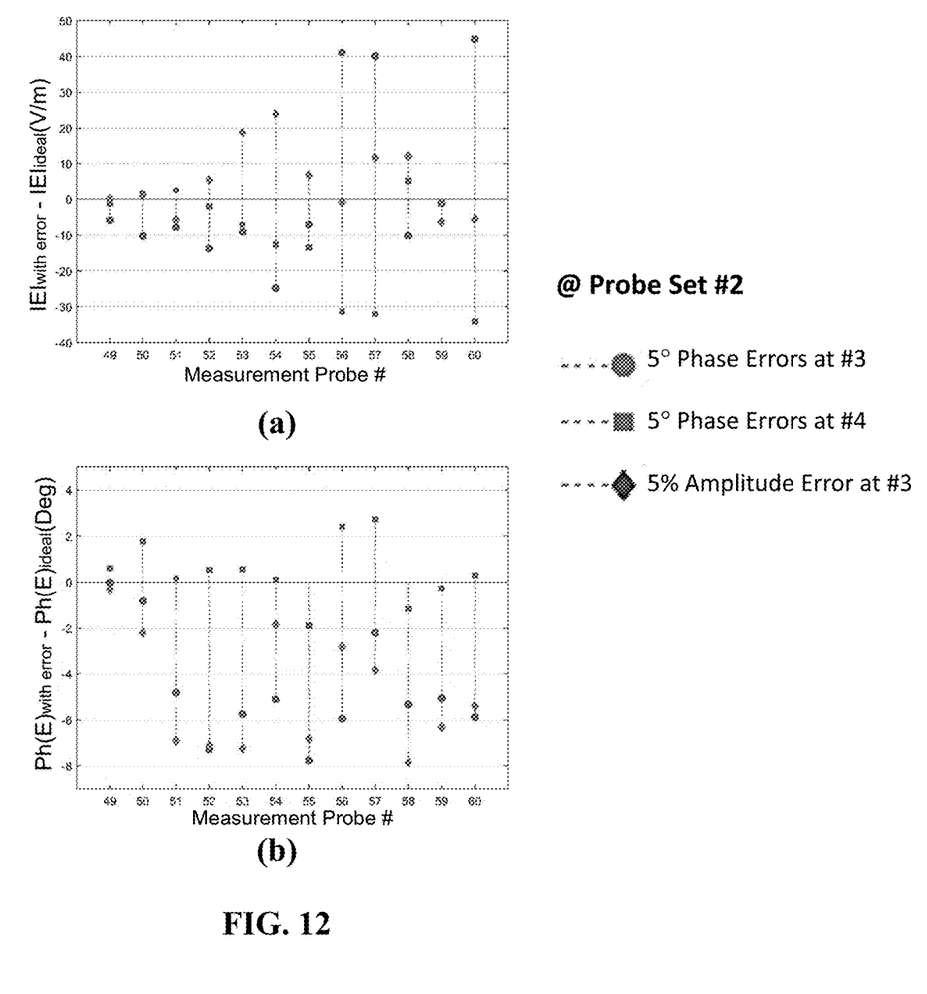
FIG. 12 are amplitude and phase of probes #49 to #60 from measurement probe set #2 when 5° phase error or 5% amplitude error were applied at array elements #3 or #4.

The second test on phased array antenna of FIG. 9 is adding an error in phase of one array element. As practical and acceptable errors in conventional phase shifters and gain controllers, some cases of 5° phase error or 5 percent amplitude error are applied to the elements #3 or #4. FIGS. 11 and 12 show the difference in amplitude and phase of electric fields at probes #17 to #28 for faulty feed with respect to the ideal cases at probe set #1 and #2, respectively. The phase information of electric fields in both FIGS. 7 and 8 provide additional patterns that help to find the imperfections based on the errors in measured fields. The pattern of fields at probe positions are unique for each error case.

Figure 13:
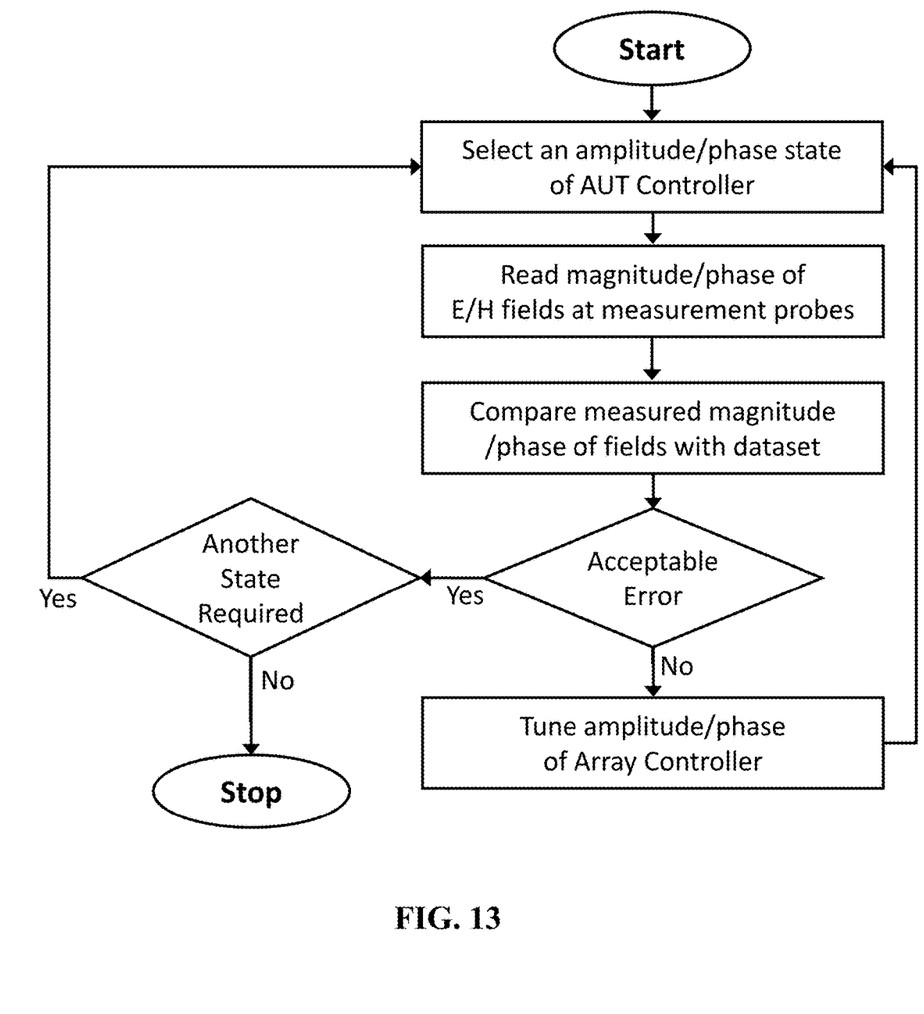
FIG. 13 is a flowchart of calibration procedure of a phased array antenna (AUT) in transmitter mode using measurement probes.
Figure 14:
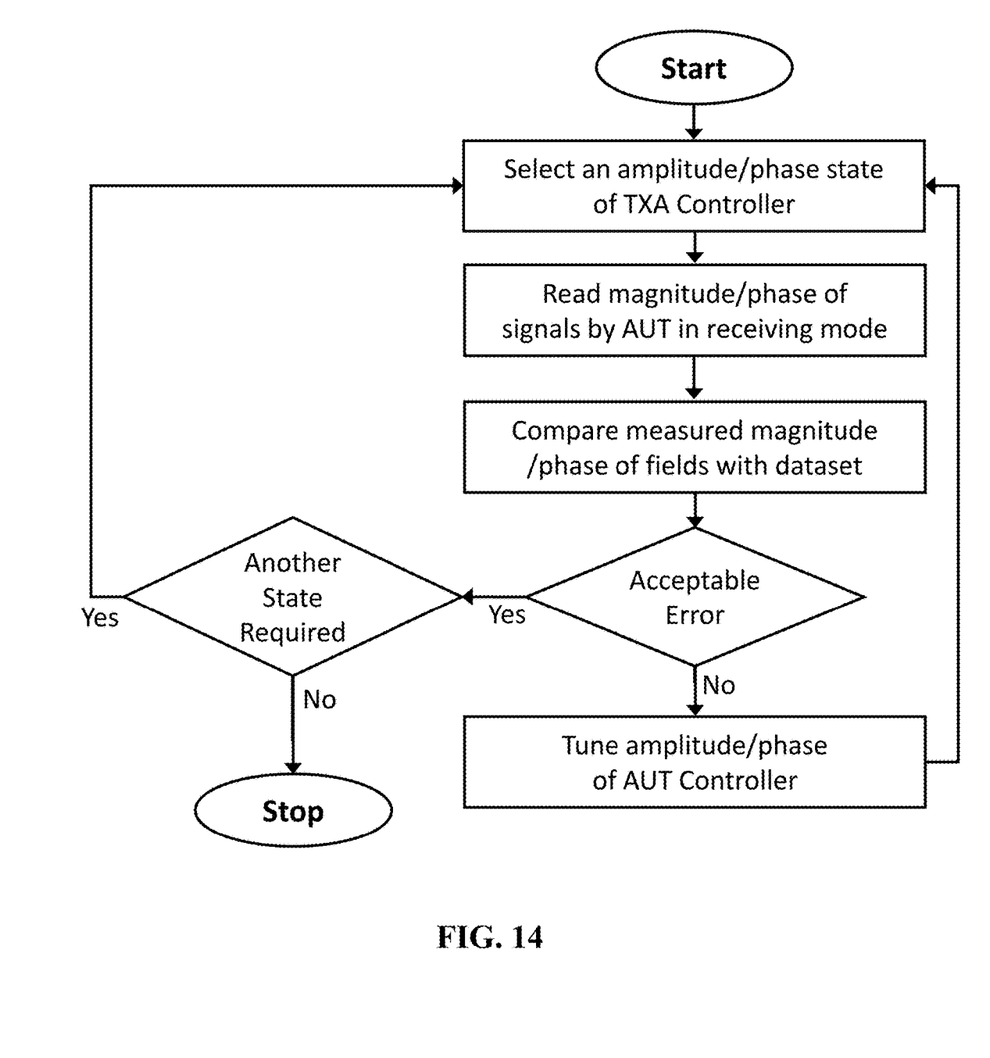
FIG. 14 is a flowchart of calibration procedure of a phased array antenna (AUT) in receiver mode using an antenna set as transmitter array (TXA).

A flowchart of calibration procedure of a phased array antenna is presented in FIG. 13. The procedure is started from an amplitude/phase state of phased array controller. Then, the amplitude and/or phase of electric and/or magnetic fields are measured by one or more measurement probe sets. If the difference between measurement values and expected values is not acceptable, the amplitude/phase of phased array controller are changed to reduce the error. If the error is acceptable, another amplitude/phase state of phased array controller can be tested or the procedure will be finished.

The very near-field information of measurement probes relates the phase shifters of antenna array to the radiation performance of antenna and can be used to monitor and adjust the radiation performance of array by tuning the phase shifters. The phase shifters tuning reaches to a desired near-field distribution and then after a desired radiation pattern.

A successive method can be used for tuning the phase shifters and gain controllers to match the measured near field of phase array antenna to a desired pattern.

A Machine Learning algorithm can be used to classify phase/amplitude errors in the feed of array and relates them to resultant errors in the measured fields. This classification can then be used in diagnosis and calibration of the phased array antenna.

It will be appreciated by those skilled in the art that the foregoing embodiments demonstrate a phased array monitoring/calibrating system, which can measure the near-field data of an array antenna for analysis, processing, and tuning the array feed signals. The measurement unit may have one or a set of receivers with a switching system, a MIMO receiver, or other device adapted for receiving and measuring the amplitude and/or phase of array antenna signal in the near-field region. The probe reader may furthermore operates in a wideband or ultra-wideband mode, or in multiple bands, to get more information from fixed probe sets. Some or all of the components of phased array monitoring/calibrating system may be provided in compact form, individual integrated circuits, integrated circuit with the phase array controller circuit, or as commercial components.

The present invention has been described above and shown in the drawings by way of example embodiments and applications, having regard to the accompanying drawings. These are merely illustrative of the present invention; it is not necessary for a particular feature of a particular embodiment to be used exclusively with that particular embodiment. Instead, any of the features described above and/or depicted in the drawings can be combined with any of the example embodiments, in addition to or in substitution for any of the other features of those example embodiments. One embodiment's features are not mutually exclusive to another exemplary embodiment's features. Further, it is not necessary for all features of an example embodiment to be used. Instead, any of the features described above can be used, without any other particular feature or features also being used. Accordingly, various changes and modifications can be made to the example embodiments and uses without departing from the scope of the invention as described herein.

REFERENCES

[1] U.S. Pat. No. 5,477,229A—Active antenna near field calibration method.
[2] U.S. Pat. No. 5,410,319A—Near field antenna measurement systems and methods.
[3] U.S. Pat. No. 4,517,570A—Method for tuning a phased array antenna.
[4] U.S. Pat. No. 5,572,219A—Method and apparatus for remotely calibrating a phased array system used for satellite communication.
[5] U.S. Pat. No. 5,644,316A—Active phased array adjustment using transmit amplitude adjustment range measurements.
[6] U.S. Pat. No. 6,084,545A—Near-field calibration system for phase-array antennas.
[7] US20150349420A1—Planar near-field calibration of digital arrays using element plane wave spectra.
[8] U.S. Pat. No. 6,163,296A—Calibration and integrated beam control-conditioning system for phased-array antennas.
[9] U.S. Pat. No. 6,600,445B2—Method and device for calibrating smart antenna array.
[10] U.S. Pat. No. 6,636,173B2—Calibration system and method for phased array antenna using near-field probe and focused null.
[11] U.S. Pat. No. 6,900,775B2—Active antenna array configuration and control for cellular communication systems.
[12] U.S. Pat. No. 7,119,739B1—Near field to far field DF antenna array calibration technique.
[13] U.S. Pat. No. 7,362,266B2—Mutual coupling method for calibrating a phased array.
[14] U.S. Pat. No. 7,768,453B2—Dynamically correcting the calibration of a phased array antenna system in real time to compensate for changes of array temperature.
[15] US20060009162A1—Method for calibrating smart antenna array systems in real time.
[16] U.S. Pat. No. 5,229,776A—Method for field monitoring of a phased array microwave landing system far field antenna pattern employing a near field correction technique.

What is claimed is:

1. A very near field method for monitoring transmitter phased array antenna comprising a measurement probe set in near-field region of an array antenna-under-test (AUT), the method comprising of the steps of:
   (a) select a set of amplitude/phase state of AUT controller;
   (b) measure amplitude and/or phase of electric and/or magnetic fields using a measurement probe set close to AUT around the radiation aperture of AUT for each state of AUT controller;
   (c) compare the very near field measurement with stored simulation and/or measurement data to find errors in near field data and (d) use a successive method of steps (a)-(c) for tuning the amplitude/phase of AUT controller to reduce the errors in step (c).

2. The method of claim 1 wherein the measurement probes are implemented in the same structure of phased array antenna such as at the edges or in different layers of a multi-layer circuit.

3. The method of claim 1 wherein the measurement probes are controlled and read with the same unit of phased array controller.

4. The method of claim 1 wherein two or more measurement probe sets are used in different distances from the AUT.

5. A very near field method for calibrating transmitter phased array antenna comprising a measurement probe set in near-field region of an array antenna-under-test (AUT), the method comprising of the steps of:
   (a) select a set of amplitude/phase state of AUT controller;
   (b) measure amplitude and/or phase of electric and/or magnetic fields using a measurement probe set close to AUT around the radiation aperture of AUT for each state of AUT controller;
   (c) compare the very near field measurement with stored simulation and/or measurement data to find errors in near field data; and
   (d) use a successive method of steps (a)-(c) for tuning the amplitude/phase of AUT controller to reduce the errors in step (c).

6. The method of claim 5 wherein a Machine Learning algorithm is used to classify the errors, the source of errors, and tuning methods, automatically.

7. The method of claim 5 wherein the measurement probes are implemented in the same structure of phased array antenna such as at the edges or in different layers of a multi-layer circuit.

8. The method of claim 5 wherein the measurement probes are controlled and read with the same unit of phased array controller.

9. The method of claim 5 wherein two or more measurement probe sets are used in different distances from the AUT.

10. The method of claim 5 wherein the AUT antennas work in a MIMO concept.

11. The method of claim 5 wherein the measurement probe sets work in a MIMO concept.

12. A very near field method for calibrating receiver phased array antenna comprising an antenna set as transmitter array (TXA) in near-field region of an array antenna-under-test (AUT) in receiving mode, the method comprising of the steps of:
    (a) select a set of amplitude/phase state of TXA controller;
    (b) measure amplitude and/or phase of TXA near fields using the AUT in receiving mode in an amplitude/phase state for each amplitude/phase state of TXA controller;
    (c) compare the very near field measurement with stored simulation and/or measurement data to find errors in near field data; and
    (d) use a successive method of steps (a)-(c) for tuning the amplitude/phase of AUT controller to reduce the errors in step (c).

13. The method of claim 12 wherein a Machine Learning algorithm used to classify the errors, the source of errors, and tuning methods, automatically.

14. The method of claim 12 wherein the TXA antennas are implemented in the same structure of AUT such as at the edges or in different layers of a multi-layer circuit.

15. The method of claim 12 wherein the TXA antennas are controlled and feed with the same unit of AUT controller.

16. The method of claim 12 wherein two or more TXA antenna sets are used in different distances from the AUT.

17. The method of claim 12 wherein the AUT antennas work in a MIMO concept.

18. The method of claim 12 wherein the TXA antennas work in a MIMO concept.

* * * * *